United States Patent
Soda et al.

[11] Patent Number: 5,806,621
[45] Date of Patent: Sep. 15, 1998

[54] ELECTRIC POWER ASSISTED BICYCLE

[75] Inventors: Hajime Soda; Masahiro Kuroki, both of Saitama, Japan

[73] Assignee: Honda Giken Kogyo Kabushiki Kaisha, Tokyo, Japan

[21] Appl. No.: 476,334

[22] Filed: Jun. 7, 1995

[30] Foreign Application Priority Data

Aug. 18, 1994 [JP] Japan .................................. 6-194447

[51] Int. Cl.⁶ .................................................. B62M 23/02
[52] U.S. Cl. .......................... 180/206; 180/207; 180/220; 180/65.8; 180/68.5
[58] Field of Search ..................................... 180/220, 205, 180/206, 207, 65.1, 65.2, 68.5, 65.8; 324/429, 433

[56] References Cited

U.S. PATENT DOCUMENTS

| 4,694,236 | 9/1987 | Upadhyay et al. ...................... 318/798 |
| 5,226,501 | 7/1993 | Takata ..................................... 180/205 |

FOREIGN PATENT DOCUMENTS

| 63-11420 | 6/1986 | Japan . |
| 405105148 | 4/1993 | Japan ..................................... 180/220 |
| 2121971 | 1/1984 | United Kingdom . |

OTHER PUBLICATIONS

"Yamaha's PAS Power–Assisted Bicycle" *Automotive Engineering* vol. 101 No. 12, Dec. 1993, p. 33.

Primary Examiner—Anne Marie Boehler
Attorney, Agent, or Firm—Birch, Stewart, Kolasch & Birch, LLP

[57] ABSTRACT

A secondary battery generates an assisting force for a bicycle. When the voltage of the battery drops, a driver can physically feel a variation in driving feeling to indicate a reduction in battery capacity and to also indicate the amount of capacity remaining. The variation in driving feeling is an increase in force required to pedal the bicycle. In other words, when charging is required, the assisting force which assists pedaling by human power will be reduced. A voltage drop detector compares data obtained by A/D conversion of the voltage of a battery with certain reference voltages set in advance and outputs voltage drop detection signals. When the voltage drop detection signal is received by an assisting force variation control, a variation assisting force is output to warn the user that battery charge is low. The variation assisting force is obtained by reducing or varying almost to zero an assisting force calculated by an assisting force calculator. A PWM signal producer outputs a PWM signal in response to the assisting force or the variation assisting force to drive a motor of the bicycle.

20 Claims, 12 Drawing Sheets

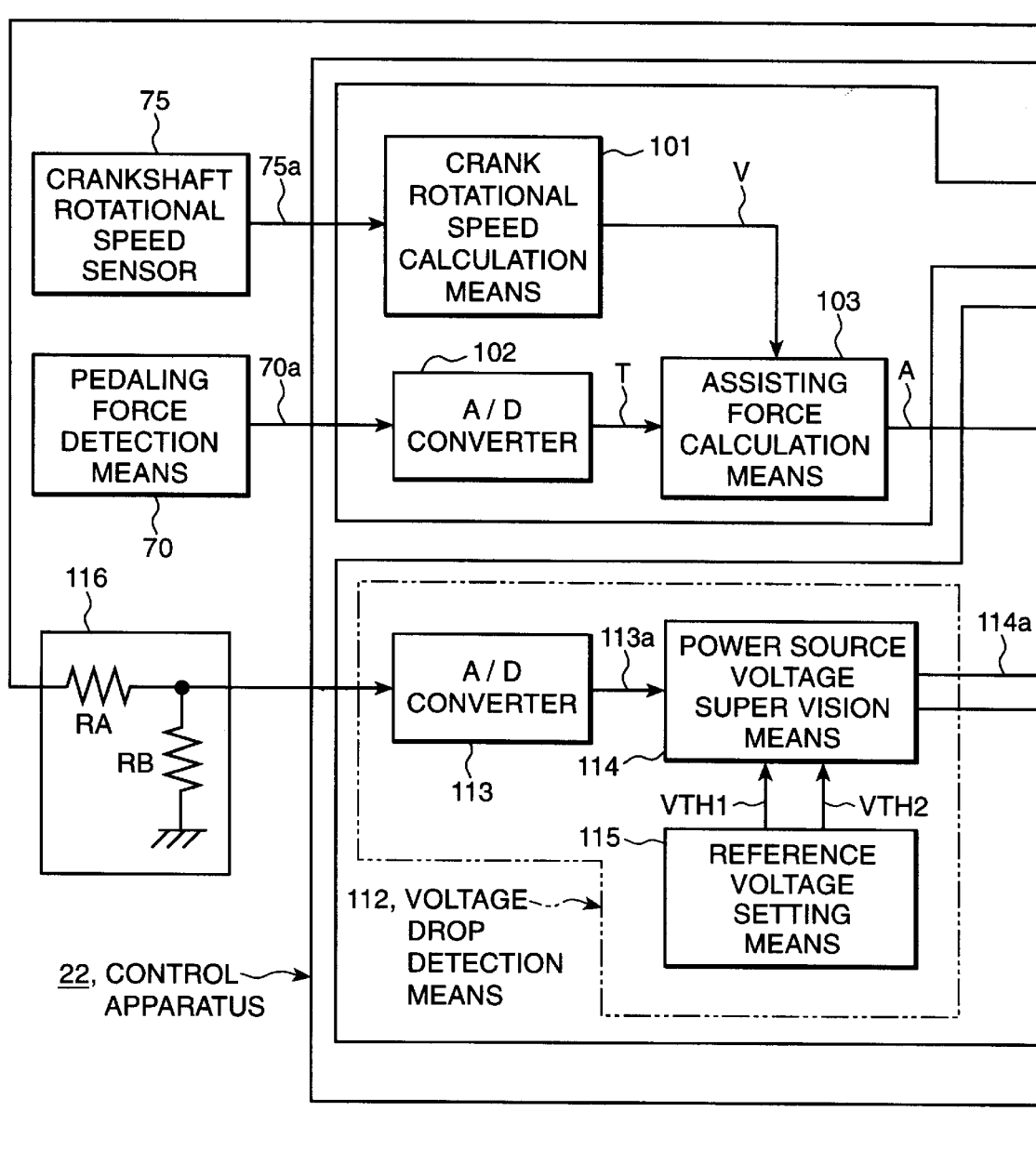

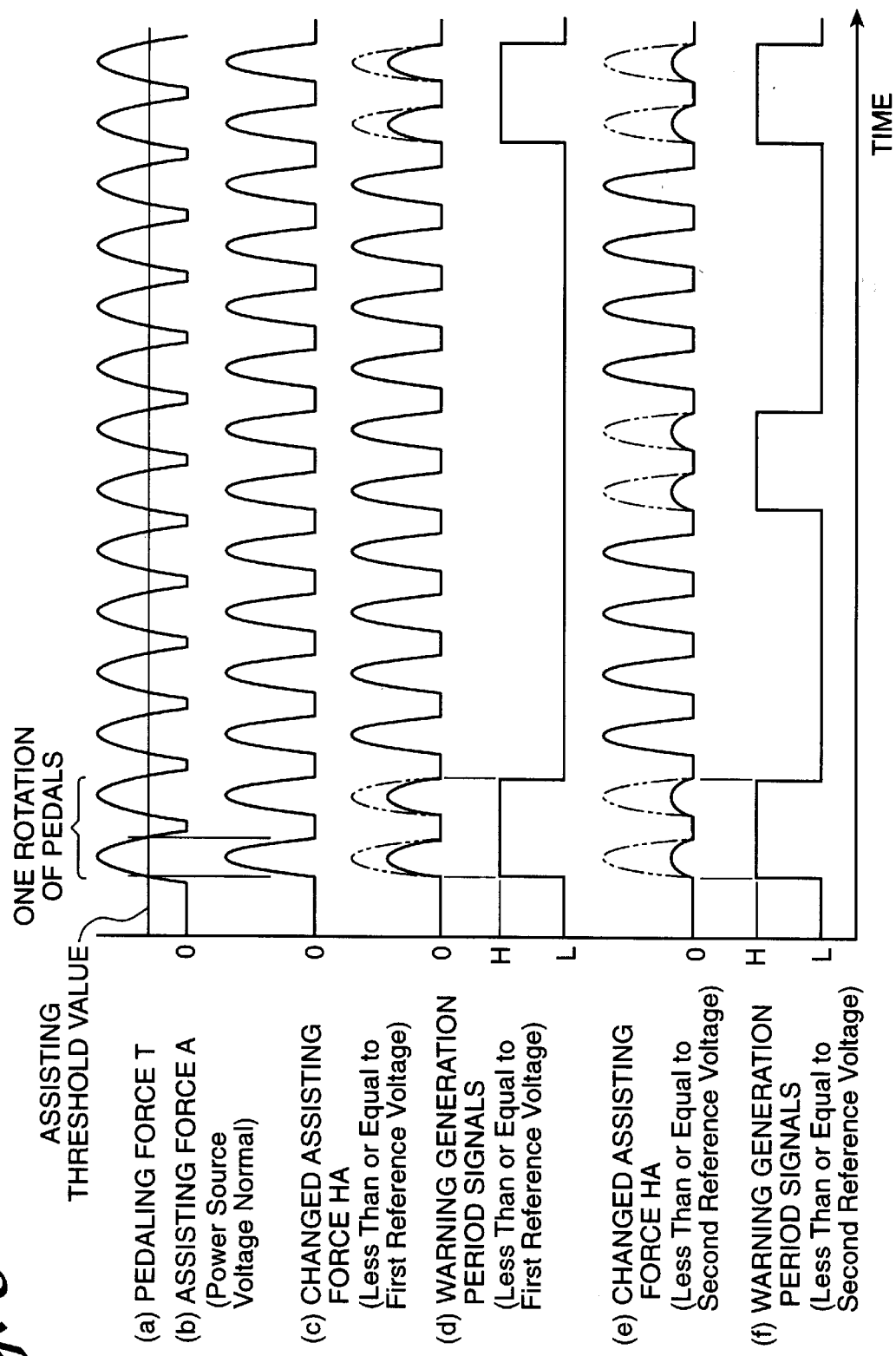

ELECTRIC POWER ASSISTED BICYCLE

BACKGROUND OF THE INVENTION

1. Field of the Invention

This invention relates to an electric power assisted bicycle wherein power of a motor is used to assist driving of the bicycle by human power. More particularly, the invention relates to an electric power assisted bicycle wherein, when the capacity of a secondary battery for generation of an assisting force (hereinafter referred to as assisting force) drops (i.e. when the voltage drops), the assisting force to assist driving by human power is varied to let a driver physically feel a variation in driving feeling. The driver will then know that the remaining capacity has been reduced and charging is required.

2. Description of Background Art

In an electrically-operated vehicle, when the voltage of a battery (secondary battery) which is a power source for driving drops to a predetermined value, a warning lamp is lit to visibly indicate that the remaining capacity limited or charging is required. For example, in Japanese Patent Laid-Open No. Sho 63-11420, a capacity warning apparatus for an electrically-operated golf cart is disclosed wherein a reference voltage and a battery voltage are compared with each other by a comparison circuit. When the battery voltage is lower than the reference voltage, a warning is given by way of a warning lamp.

SUMMARY AND OBJECT OF THE INVENTION

Although it is possible to give an audible display using a buzzer or speech synthesis to immediately inform the driver when a drop of the battery voltage is detected and a warning lamp with a light or a light emitting diode is lit, when the vehicle is a bicycle, since the warning sound is heard by some people other than the driver, there is a restriction in sound volume or tone quality.

Therefore, it is necessary to immediately notify the driver of a voltage drop. When a visible display of a voltage drop is developed, the driver can promptly be notified by the visible display.

The present invention has been made to solve the problems described above, and it is a first object of the present invention to provide an electric power assisted bicycle wherein the assisting force is intentionally varied to allow the driver to physically feel a drop of the voltage of a battery. When a drop of the voltage is detected, the driver can promptly be notified.

It is a second object of the present invention to provide an electric power assisted bicycle wherein a driver's attention is called by a variation in assisting force and a warning lamp which indicates a drop in capacity or that a charging time has come. This is indicated by a blinking light so that it can be readily recognized by intuition and that the variation in assisting force is a warning of the drop of the battery voltage.

It is a third object of the present invention to provide an electric power assisted bicycle wherein the degree in variation of the assisting force or the indication manner of an indicator is varied so that the driver can be notified of the degree of the remaining capacity of a battery.

In order to solve the subjects described above, an electric power assisted bicycle comprises assisting force variation type warning means for intentionally varying, when a voltage drop of a battery power source for supplying power to a motor is detected, the operation condition of the motor to vary the assisting force to provide a warning to change a feeling in driving.

An electric power assisted bicycle is characterized in that the degree of variation of the assisting force is varied in response to the degree of the drop of the voltage of the battery power source.

An electric power assisted bicycle is further characterized by a visible indicator for indicating a drop in voltage or that charging is required. Indicator control means causes the indication of the indicator to blink in association with the variation of the assisting force.

An electric power assisted bicycle has the indicator control means vary the blinking manner of the indication of the indicator in response to the degree of the drop of the voltage of the battery power source.

If a drop of the voltage of the battery power source is detected, then the assisting force variation type warning means intentionally varies the driving condition of the motor to vary the assisting force. Consequently, the assisting force to be supplied from the motor is varied. As the feeling in pedaling the pedals varies, the driver can physically feel that the capacity of the battery power source has been reduced.

It is to be noted that, by varying the degree of variation of the assisting force in response to the degree of the drop of the voltage of the battery power source, the driver can perceive the remaining capacity of the battery such that, for example, since the feeling in pedaling the pedals has become a little heavy, charging is required earlier or since the feeling in pedaling the pedals is considerably heavy, the battery may be soon exhausted.

With the electric power assisted bicycle, since the indication of the indicator is caused to blink in association with the variation of the assisting force, it can be confirmed from the blinking of the indication that the variation in driving feeling originates from a reduction of the remaining capacity of the battery power source. If the driver physically feels the variation in assisting force and carefully observes the indication section or the like, then since the indicator of a battery remaining capacity warning lamp or a warning lamp which indicates that charging is required is blinking, it can be readily recognized that the variation of the assisting force is originated from the reduction of the battery capacity.

Further, since the blinking manner of the indicator is varied in response to the degree in the drop of the voltage of the battery power source, such remaining capacity of the battery that the battery may be soon exhausted can be visibly indicated in such a manner that, for example, the blinking interval of the indicator is reduced or the rate of the time within which the indicator is lit becomes higher than the rate of the time within which the indicator is extinguished.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 shows a time chart illustrating examples of operation of assisting force variation means;

PREFERRED EMBODIMENTS OF THE INVENTION

The following embodiments of the present invention will be described with reference to the drawings.

Figure 1:
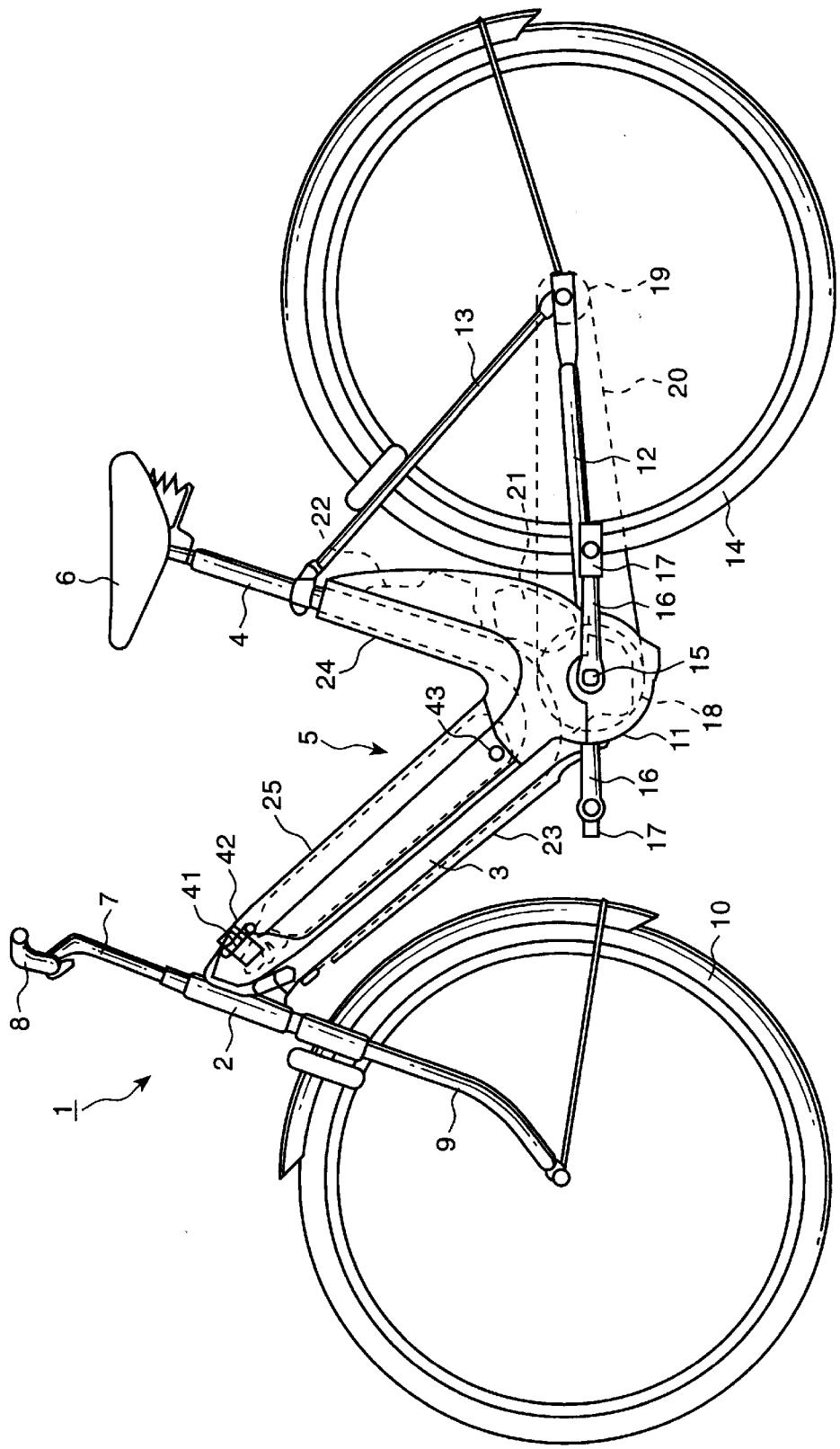
FIG. 1 illustrates a side elevational view of an electric power assisted bicycle according to the present invention.

FIG. 1 is a side elevational view of an electric power assisted bicycle according to the present invention. A down tube 3 extends in an oblique rearward downward direction from a head pipe 2 of the electric power assisted bicycle 1. The down tube 3 curves upwardly at a lower end such that a seat tube 4 extends in an oblique rearward upward direction therefrom. A main frame 5 of a substantially V-shaped configuration is constituted from the down tube 3 and the seat tube 4. A seat 6 is provided at an upper end of the seat tube 4.

A steering shaft 7 is fitted for rotation in the head pipe 2, and a steering handlebar 8 is mounted integrally at an upper end of the steering shaft 7. A front wheel 10 is supported for rotation at lower ends of a pair of left and right front forks 9 which extend integrally downwardly from the steering shaft 7.

A bracket 5a (refer to FIG. 3) is provided projecting from a lower portion of the curved portion of the main frame 5 at which the down tube 3 and the seat tube 4 cross each other. A transmission gear mechanism is accommodated in the bracket 5a while a gear box 11 which serves also as a crankcase is mounted integrally on the bracket 5a. A rear fork 12 directed in the forward and rearward direction is integrally mounted at a front end thereof on the gear box 11, and a stay 13 is mounted on the seat tube 4 and a rear end of the rear fork 12. A rear wheel 14 is supported for rotation at the rear end of the rear fork 12.

A crankshaft 15 is mounted for rotation on the gear box 11, and a pair of crank arms 16 are integrally mounted at the opposite left and right ends of the crankshaft 15. A pedal 17 is mounted at an end of each of the crank arms 16.

An endless chain 20 extends between and around a driving sprocket wheel 18 integrally provided on the crankshaft 15 and a driven sprocket wheel 19 integrally provided on the rear wheel 14. When the crankshaft 15 is driven to rotate by the pedaling force applied to the pedals 17, the rear wheel 14 is rotated by way of the driving sprocket wheel 18, the endless chain 20 and the driven sprocket wheel 19 so that the electric power assisted bicycle 1 can run as a bicycle.

Further, a motor 21 is secured to the gear box 11 along the seat tube 4. A control apparatus 22 including an electronic control unit, a motor driver and so forth for controlling rotation of the motor 21 is provided at a position on a rear side face of the seat tube 4 above the motor 21. When rotation of the motor 21 is controlled by the control apparatus 22, the rotational torque of the motor 21 is transmitted to the crankshaft 15 by way of the transmission gear mechanism so that human power may be assisted by the power of the motor 21.

The main frame 5 constituted from the down tube 3 and the seat tube 4 is covered with a side cover 23, which is split into two left and right portions, and a center cover 24 which are arranged in a substantially V-shaped configuration. An elongated battery case assembly 25 can be removably mounted on an inclined upper face of the side cover 23 which covers the down tube 3.

A main switch 41 formed from a key switch (combination switch) or the like is disposed at a front end portion of the side cover 23. It is to be noted that, when the switch is turned to an on position, the battery case assembly 25 is prevented from being removed by way of a locking apparatus (not shown) which operates in response to an operation of the main switch 41.

An indicator 42 for visibly indicating a drop of the voltage of a battery power source and that charging is required is disposed in the proximity of the main switch 41.

Meanwhile, a connection portion 43 for connection with a charging connector or the like is provided on a side face of the battery case assembly 25 so that charging can be performed even when the battery case assembly 25 is mounted on the electric power assisted bicycle 1.

It is to be noted that the indicator 42 may otherwise be provided on the side of the battery case assembly 25. In this instance, the connector structure may be such that the battery case assembly 25 can be connected to the indicator 42 by mounting the battery case assembly 25 onto the indicator 42. Alternatively, when the battery case assembly 25 is connected to a charger not shown, the indicator 42 and a charging control circuit on the charger side may be electrically connected to each other while a charging condition is indicated using the indicator 42 mounted on the battery case assembly 25.

Figure 2:
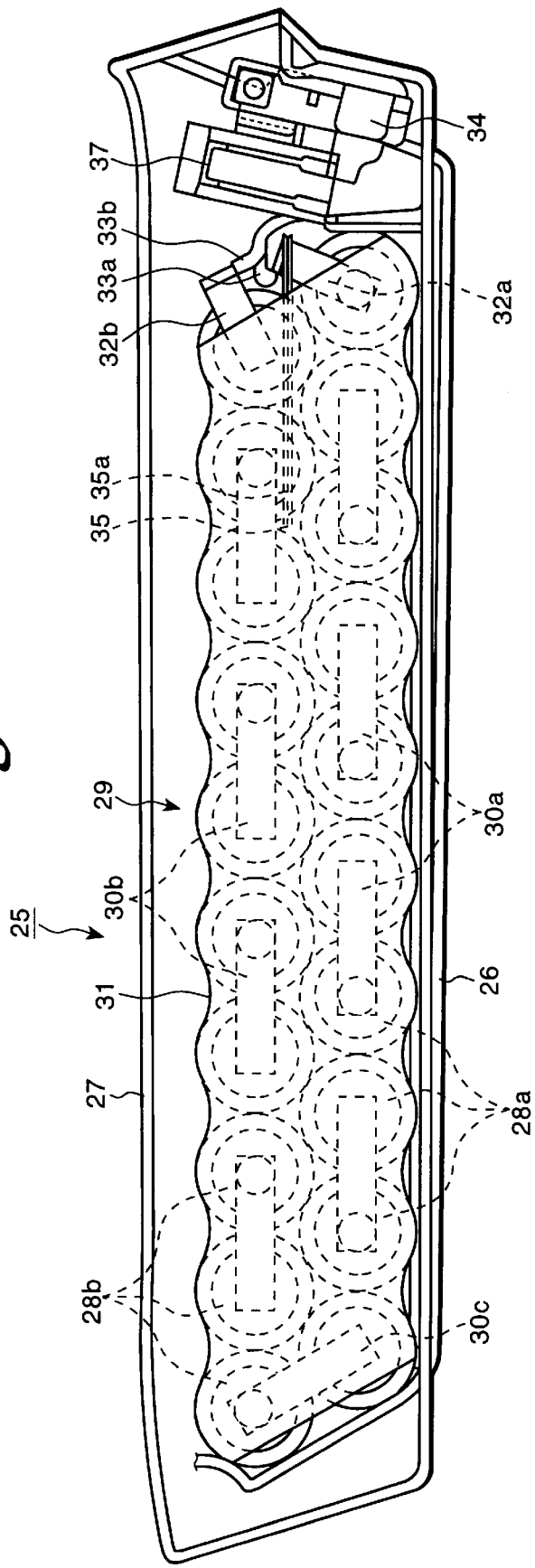
FIG. 2 shows a vertical sectional view of a battery case.

FIG. 2 is a vertical sectional view of the battery case. The battery case assembly 25 is divided into two upper and lower portions of a lower case 26 and an upper case 27. A power source battery set 29 including 20 cylindrical-D-size Ni—Cd (nickel-cadmium) batteries 28a and 28b is removably fitted in the battery case assembly 25. Further, the upper case 27 of the battery case assembly 25 constitutes part of an outer surface of a body of the electric power assisted bicycle 1.

The power source battery set 29 is constructed in such a manner as described below. The 10 Ni—Cd batteries 28a are arranged in a row in a direction perpendicular to the center lines of the Ni—Cd batteries 28a in a condition wherein the positive and negative poles are positioned alternately between each adjacent Ni—Cd batteries 28a and circumferential faces of the Ni—Cd batteries 28a are held in contact with each other. The Ni—Cd batteries 28b in the upper layer are placed such that the upper Ni—Cd batteries 28b may be received in upper recessed portions of the row of the Ni—Cd batteries 28a in the lower layer. As indicated by broken lines in FIG. 2, the opposite ends of connection pieces 30a are connected by soldering to the positive and negative poles of the adjacent Ni—Cd batteries 28a in the lower layer, and also the Ni—Cd batteries 28b in the upper layer are connected to each other similarly using connection pieces 30b. At the Ni—Cd batteries 28a and 28b at the front ends (left ends in FIG. 2), the positive and negative poles are connected to each other by a connection piece 30c. The upper and lower Ni—Cd batteries 28a and 28b are then inserted into a tubular heat contractive synthetic resin film 31, whereafter the heat contractive synthetic resin film 31 is heated to contract itself.

A pair of leads 33a and 33b are integrally connected at one end thereof by soldering to terminal pieces 32a and 32b connected to the negative pole and the positive pole of the Ni—Cd battery 28a at the rear end (right end in FIG. 2) and the Ni—Cd battery 28b at the rear end. The other ends of the leads 33a and 33b are connected to a feeding connector 34 (details are shown in FIG. 3) so that power may be supplied to the control apparatus 22 side by way of the feeding connector 34.

A heat sensitive resistance element 35 such as a thermistor is disposed between the Ni—Cd batteries 28a and 28b of the upper and lower layers. The heat sensitive resistance element 35 is connected to a charging connector 36 shown in FIG. 3 by way of a lead 35a. Accordingly, when charging is performed using the charger (not shown), the charger side (not shown) can supervise the temperature of the location of-the Ni—Cd batteries 28a and 28b from the resistance value of the heat sensitive resistance element 35. Further, various fuses 37 and circuit parts such as a diode (not shown) for preventing a charging voltage of a reverse polarity from being supplied are mounted in the battery case assembly 25.

Figure 3:
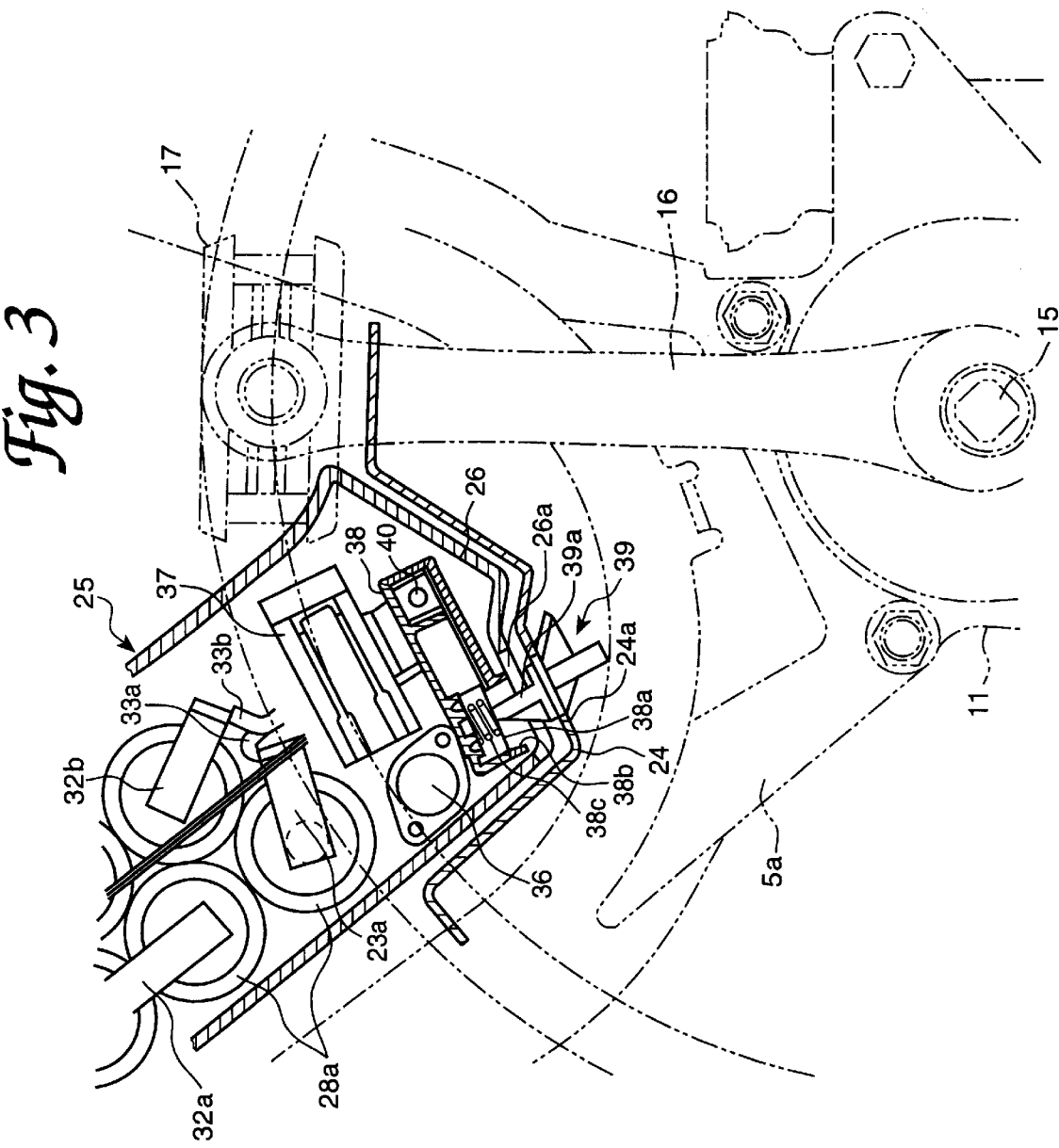
FIG. 3 shows a vertical sectional side elevational view of a rear portion of a battery case assembly and a bottom portion of a center case.

FIG. 3 is a vertical sectional side elevational view of a rear portion of the battery case assembly and a bottom portion of the center case. A feeding connector 38 is disposed at a rear end portion of the battery case assembly 25. The feeding connector 38 includes a pair of left and right contact terminals 38a each made of a conductive elastic material such as a copper alloy plate. Each of the contact terminals 38a is secured, at an end portion thereof, to the connector case using a screw 40 and is electrically connected to the lead 33a or 33b.

A connector 39 which makes a counterpart of the feeding connector 38 is disposed on a bottom wall 24a of the center cover 24. The connector 39 has a pair of left and right bar-like projecting terminals 39a. When the battery case assembly 25 is mounted on the bicycle, the projecting terminals 39a extend through openings 26a formed in the lower case 26 and openings 38b of the feeding connector 38 until ends thereof are contacted with the contact terminals 38a. The power of the battery power source is supplied by way of this connection. The other end portion of each of the contact terminals 38a is pushed up and displaced by the contact terminal 38a. A coil spring 38c is provided at the displacement portion to obtain a sufficient contacting pressure and to make occurrence of momentary disconnection of supply of the power by driving oscillations or the like difficult.

Figure 4:
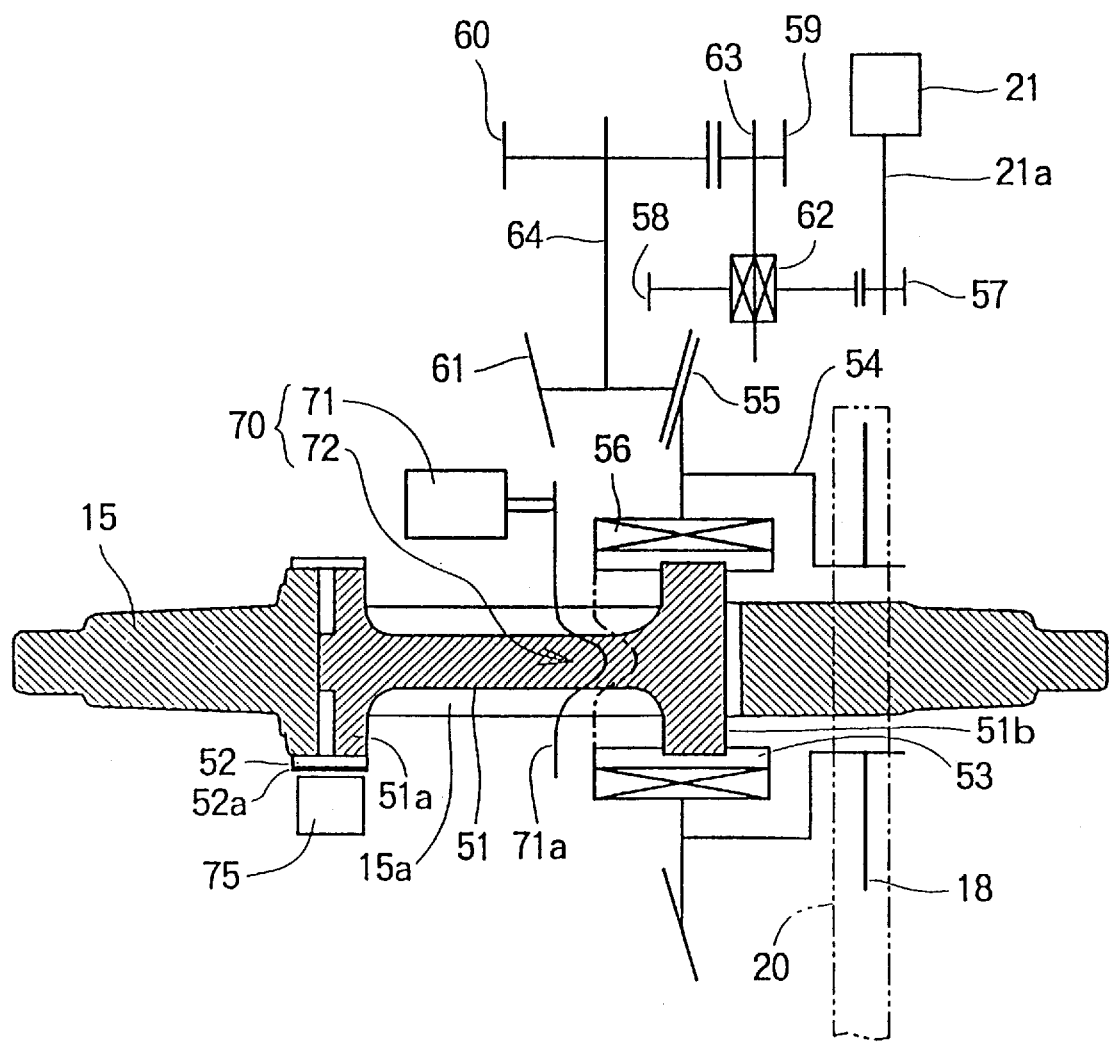
FIG. 4 shows a schematic structural view of a transmission gear mechanism and pedaling force detection means.

FIG. 4 is a schematic structural view of the transmission gear mechanism and pedaling force detection means. A through-hole 15a is formed in an intermediate portion of the crankshaft 15 in its axial direction such that it extends through the crankshaft 15 in both a diametrical direction and in the axial direction. A torsion bar 51 accommodated coaxially with the crankshaft 15 in the inside of the through-hole 15a has a head portion 51a formed at a left end (input end) thereof and is coupled to the crankshaft 15 by way of a collar 52. The torsion bar 15 has a head portion 51b formed at a right end (output end) thereof and coupled to an annular driving member 53 by force fitting in a recessed groove formed on an inner periphery of the driving member 53. A pair of wall faces of the through-hole 15a of the crankshaft 15 which are opposed to each other are curved substantially arcuately thereby to allow relative rotation of the crankshaft 15 over a predetermined angle around the head portion 51b on the free end side of the torsion bar 51 and to prevent breaking of the torsion bar 51 when an excessively high load acts upon the same.

A first one-way clutch 56 is provided between a bevel gear 55 securely mounted on the inner periphery of a sleeve 54 and the annular driving member 53. If the pedals 17 (not shown in FIG. 4) are pedaled to forwardly rotate the crankshaft 15, the torque of the crankshaft 15 is transmitted by way of the torsion bar 51, the driving member 53, the bevel gear 55 and the sleeve 54 to the driving sprocket wheel 18 spline coupled to the outer periphery of the sleeve 54. The driving force is then transmitted to the rear wheel 14 by way of the endless chain 20 and the driven sprocket wheel 19 shown in FIG. 1. On the other hand, if the pedals 17 (not shown) are pedaled to reversely rotate the crankshaft 15, the first one-way clutch 56 will slip to allow the reverse rotation of the crankshaft 15.

When the motor 21 is driven to rotate, the torque of an output shaft 21a thereof is transmitted to the driving sprocket wheel 18 by way of four spur gears 57, 58, 59 and 60 and two bevel gears 61 and 55. Further, in order that rotation of the driving sprocket wheel 18 by human power may be prevented even in a condition wherein the motor 21 stops, a second one-way clutch 62 is provided for a first intermediate shaft 63. It is to be noted that reference numeral 64 denotes a second intermediate shaft.

Pedaling force detection means 70 is constituted from torque-displacement conversion means 71 for converting a twist by a pedaling force (torque) into a displacement in an axial direction, and a stroke sensor 72 for outputting an electric signal corresponding to the displacement. The torque-displacement conversion means 71 is constituted from a convex cam face formed on an end face of a slider inner member 71a which rotates integrally with the crankshaft 15 and a concave cam face formed on an end face of the driving member 53 and engaged with the convex cam face.

In order to detect a speed of rotation of the crankshaft 15, a toothed portion 52a is formed on an outer periphery of the collar 52 for coupling the crankshaft 15 and the head portion 51a of the torsion bar 51 to each other. A crankshaft rotational speed sensor 75 is disposed in an opposing relationship to the toothed portion. The crankshaft rotational speed sensor 75 is constructed such that it optically or magnetically detects the toothed portion 52a and outputs a detection pulse.

FIG. 5 is a functional block diagram of the control apparatus of the electric power assisted bicycle according to the present invention. The control apparatus 22 includes motor drive control means 100, assisting force variation warning means 110 and indicator control means 120.

The motor drive control means 100 includes crank rotational speed calculation means 101, an A/D converter 102, assisting force calculation means 103 and PWM signal production means 104.

The crank rotational speed calculation means 101 outputs data (hereinafter referred to as crank rotational speed) V regarding the crank rotational speed in response to a pulse signal 75a regarding the crank rotational speed. The rotational speed of the crank is detected by the crankshaft rotational speed sensor 75.

A voltage signal 70a regarding the pedaling force outputted from the pedaling force detection means 70 is converted into a digital signal (hereinafter referred to as pedaling force) T corresponding to the pedaling force by the A/D converter 102.

The assisting force calculation means 103 calculates, from the pedaling force T and the crank rotational speed V, an assisting force in accordance with an operation expression set in advance or by reference to a conversion table registered in advance, and outputs assisting force data A.

The PWM signal production means 104 produces and outputs, from assisting force data A or variation assisting force data HA supplied thereto by way of the assisting force variation warning means 110, a PWM signal 104a necessary to supply an assisting force from the motor 21. The PWM signal 104a is supplied to the gate of a field effect transistor FET by way of a gate driving circuit or the like not shown so that PWM driving of the motor 21 is performed.

It is to be noted that reference character B denotes the battery power source, and reference character SW denotes feed switching means for contacts or the like of the main switch or a relay which operates in response to the main switch.

The assisting force variation warning means 110 includes assisting force variation control means 111 and voltage drop detection means 112. The voltage drop detection means 112 includes an A/D converter 113, power source voltage supervision means 114 and reference voltage setting means 115.

The power source voltage of the battery power source B is divided into a voltage within an allowable input voltage range of the A/D converter 113 by resistors RA and RB in a resistor voltage divider 116. The thus divided battery power source voltage is supplied to the A/D converter 113 to obtain digital voltage data 113a.

The reference voltage setting means 115 is provided to set a voltage at which a warning of a drop of the battery capacity is to be generated, and in the present embodiment, it sets two different voltages. A first reference voltage VTH1 is set in order to notify that the remaining capacity of the battery has slightly been reduced and charging is required. For example, it is set to 22 volts with respect to 24 volts of a rated output voltage of the battery power source B. A second reference voltage VTH2 is set to a voltage at which the remaining capacity of the battery is almost exhausted or a voltage for preventing the battery from entering an over discharge condition, for example, to 20 volts. The reference voltage setting means 115 can be constituted from a ROM in which reference voltage data set in advance are stored or a digital switch or the like.

It is to be noted that the control apparatus 22 is constructed so as to operate with a low voltage (for example, 5 volts) supplied thereto by way of a stabilized power source (not shown) of the step-down type, and is constructed so as to operate even when the battery voltage drops below the second reference value.

The power source voltage supervision means 114 includes voltage data temporary storage means such as a RAM or a memory of the FIFO type for temporarily storing digital voltage data 113a obtained by A/D conversion at predetermined time intervals. The power source voltage supervision means 114 also calculates an average value of a plurality of time series data (for example, 5 data) to obtain a short time average voltage of the battery, power source B. Further, the power source voltage supervision means 114 compares the short time average voltage with the reference voltages VTH1 and VTH2, and outputs a first voltage drop detection signal 114a when it detects that the power source voltage of the battery power source B has dropped below the first reference voltage VTH1. A second voltage drop detection signal 114b is output when the battery voltage has further reduced until it becomes lower than the second reference voltage.

The assisting force variation control means 111 supplies, when the voltage drop detection signal 114a or 114b is not supplied thereto, assisting force data A outputted from the assisting force calculation means 103 as they are to the PWM signal production means 104. However, when the first voltage drop detection signal 114a or 114b is supplied thereto, the assisting force variation control means 111 changes part of the assisting force data A and supplies the thus changed variation assisting force data HA to the PWM signal production means 104. Further, while changing of the assisting force data A is being performed, the assisting force variation control means 111 supplies to the indicator control means 120 warning generation period signal 111a which indicates that a physical feeling warning is being generated.

The indicator control means 120 includes indicator format control means 121 for generating and outputting an indicator driving signal 121a in response to the voltage drop detection signal 114a or 114b and the warning generation period signal 111a. The indicator control means 120 also includes indicator format memory means 122 formed from a ROM or the like in which data regarding various indication manners set in advance are stored.

The indicator driving signal 121a is supplied to an indicator driving circuit 123. The indicator 42 is a lamp or a light emitting diode, for example. This indicator 42 is illuminated by way of the indicator driving circuit 123. It is to be noted that the indicator 42 may be of the type which displays a histogram (pictograph) of a battery or characters of charge or the like.

FIG. 6 is a time chart illustrating examples of operation of the assisting force variation means.

Operation examples illustrated in FIG. 6 are constructed such that both the degree of reduction of the assisting force and the distance at which reduction is performed are varied in response to the degree in the drop of the voltage of the battery power source.

In FIG. 6, (a) illustrates the variation of the pedaling force T. When the pedals of a bicycle are operated, the pedaling force is zero at the top dead center and the bottom dead center from the structure of the bicycle. It is to be noted that, in this figure, the case wherein the pedals are pedaled at a fixed speed with a fixed force is illustrated. Since the assisting force calculation means 103 is constructed such that it calculates and outputs an assisting force when the pedaling force T exceeds an assisting threshold value, an assisting force A illustrated in (b) of FIG. 6 is outputted. If the power source voltage of the battery power source B is higher than the first reference voltage VTH1, then since the assisting force data A are supplied as they are to the PWM signal production means 104, the assisting force illustrated in (b) of FIG. 6 is supplied from the motor 21.

When the power source voltage of the battery power source B becomes lower than the first reference voltage VTH1 (for example, 22 volts) and a first voltage drop detection signal 114a is supplied, the assisting force variation control means 111 outputs variation assisting data HA obtained by multiplying the assisting force data A by a predetermined first coefficient lower than 1, for example, 0.6 to 0.8. In (c) of FIG. 6, the case wherein the assisting force is reduced for a period of one rotation of the pedals and such reduction of the assisting force is performed each time the pedals (crankshaft) are rotated by predetermined rotations (for example, 10 rotations) is illustrated. Further, while the assisting force variation control means 111 is performing the assisting force reduction, it outputs a warning generation period signal 111a as seen in (d) of FIG. 6.

If the power source voltage of the battery power source B becomes lower than the second reference voltage VTH2 (for example, 20 volts) and a first voltage drop detection signal 114a is supplied, then the assisting force variation control means 111 outputs variation assist data HA obtained by multiplying the assisting force data A by another coefficient (for example, 0.2) further lower than the first coefficient every five rotations of the pedals as seen from (e) of FIG. 6, and outputs a warning generation period signal 111a corresponding to this as seen from (f) of FIG. 6.

Figure 7:
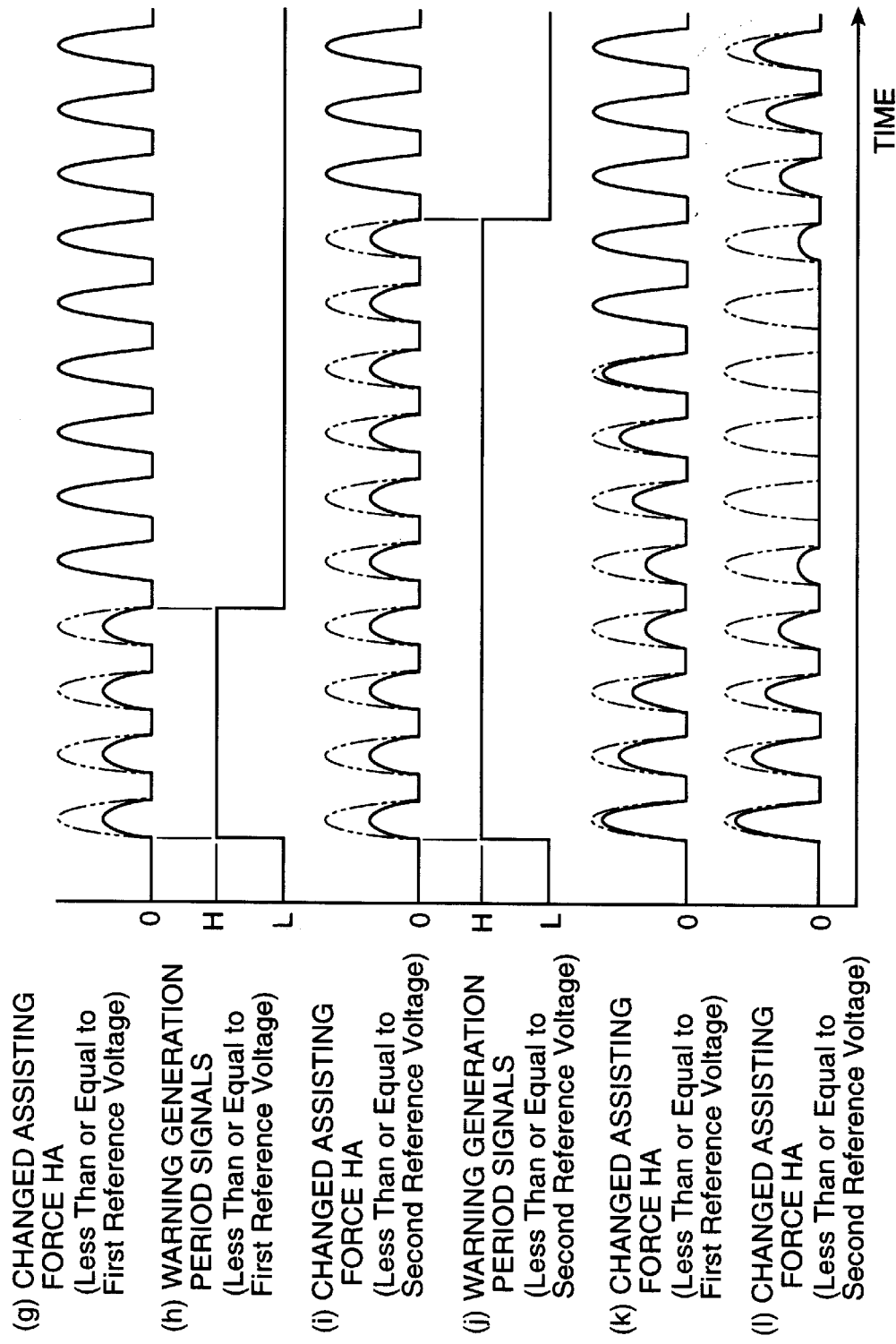
FIG. 7 shows a time chart illustrating other examples of operation of the assisting force variation means.

FIG. 7 is a time chart illustrating different examples of operation of the assisting force variation means.

The waveforms shown in (g) and (i) of FIG. 7 are obtained by fixing the degree of reduction of the assisting force and varying the interval at which reduction is performed. For example, (g) of FIG. 7 shows the waveform in a case wherein, when the power source voltage becomes lower than the first reference voltage VTH1 (for example, 22 volts), the assisting force is reduced approximately to half and this is continued for two rotations of the pedals. In FIG. 7, (i) shows the waveform in a case wherein, when the power source voltage becomes lower than the second reference voltage VTH2 (for example, 20 volts), the assisting force is reduced approximately to half similarly as shown in (g) of FIG. 7 and this is continued for 5 rotations of the pedals. For situation (g) and (i) of FIG. 4, a warning signal can be output as shown in (h) and (j) of FIG. 7, respectively.

It is to be noted that, as the remaining capacity of the battery power source decreases, the battery power source voltage may vary in response to a current value to be supplied. It is assumed that, if a high assisting force is requested and the current to the motor 21 becomes high, the battery power source voltage drops below a reference voltage, and then when the motor current decreases, the battery power source voltage returns above the reference voltage. A voltage drop detection signal is then output and stopped. If the assisting force is varied in response to such voltage drop detection signal, then there is the possibility that an inadvertent reactive force may act upon a foot pedaling a pedal.

Therefore, the power source voltage supervision means 114 is constructed such that, after it outputs a voltage drop detection signal, it stops outputting of the voltage drop detection signal at a point of time when the condition wherein the power source voltage is higher than a reference value continues for a predetermined period of time. Further, the assisting force variation control means 111 does not vary the assisting force immediately at a point of time when a voltage drop detection signal is supplied thereto, but thereafter confirms that the assisting force data A have changed to zero and varies the assisting force in synchronism with a next pedal rotating cycle. Accordingly, such a situation that the pedal suddenly becomes heavy and an unexpected reactive force acts upon a foot or the assisting force reduction condition is canceled suddenly, it is felt that slipping of the foot will not occur.

In FIG. 7, (k) and (l) show the waveforms when the assisting force is varied moderately over several rotations of the pedals. For example, (k) of FIG. 7 shows the waveform in a case wherein, when the power source voltage becomes lower than the first reference voltage VTH1 (for example, 22 volts), the assisting force is first decreased for every rotation of the pedals and then restored. In FIG. 7, (l) shows the waveform in another case wherein the assisting force is reduced for every rotation of the pedals until it becomes equal to zero and is then restored gradually.

It is to be noted that, while reduction of the assisting force may be repeated at a predetermined interval, since the driver becomes aware that the battery capacity decreases as a variation in driving feeling is physically felt, reduction of the assisting force is not performed any more after it is performed once or several times (for example, three times or so). Further, when the battery voltage is lower than the second reference voltage, since there is the possibility that the battery may be over discharged, the process of stopping the assisting operation first for a predetermined time (for example, 10 seconds) and performing the assisting operation for a predetermined time (for example, for several ten second periods), whereafter the assisting operation is stopped, may be performed several times (for example, four times). Thereafter, the assisting operation may be stopped completely to reduce consumption of the battery power source.

Figure 8:
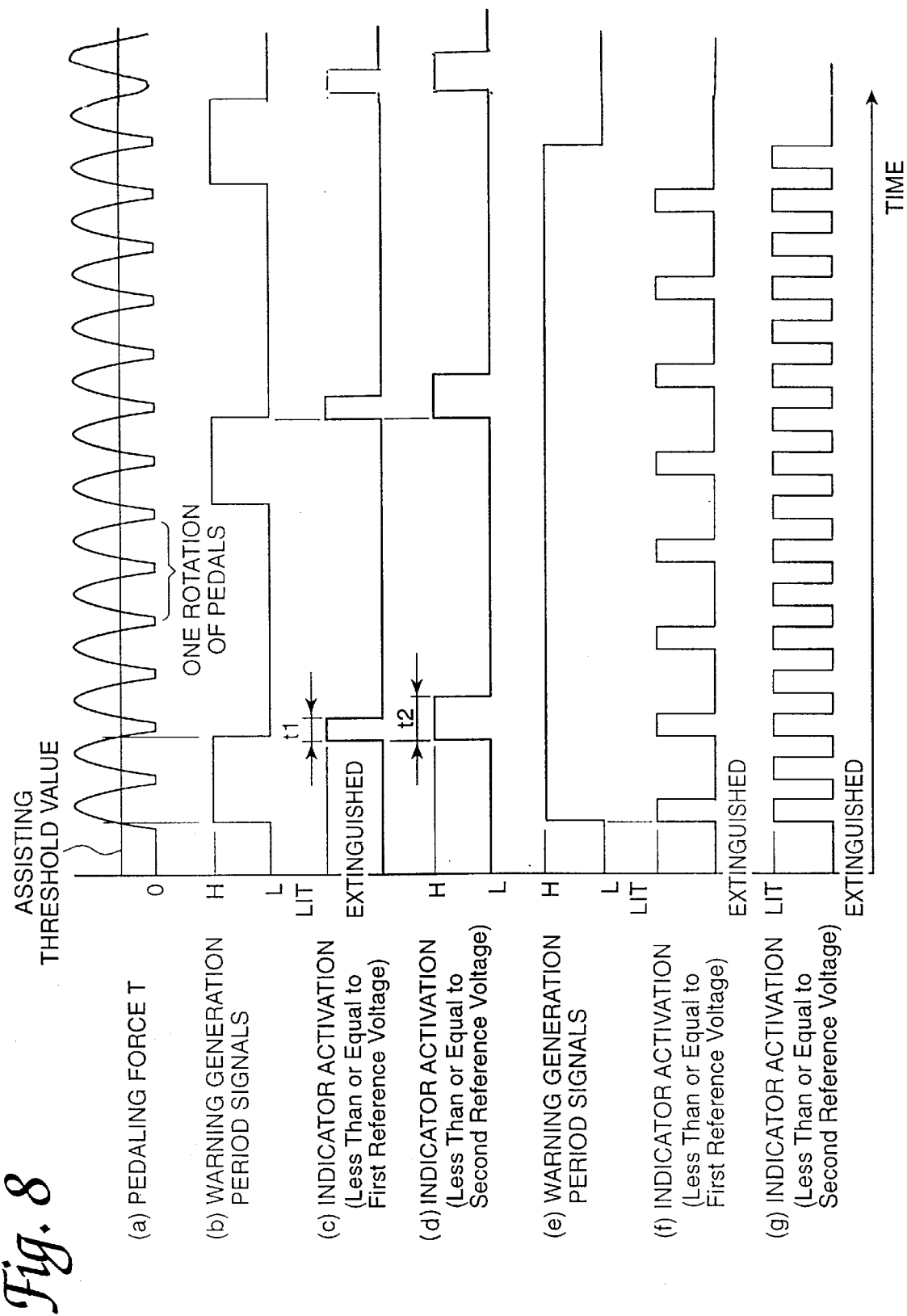
FIG. 8 shows a time chart illustrating examples of operation of indicator control means.

FIG. 8 is a time chart illustrating examples of operation of the indicator control means.

In FIG. 8, (a) and (b) show the pedaling force T and the warning generating period signals, respectively. In (c) and (d) of FIG. 8, the waveforms when the indicator 42 is lit for a predetermined time in synchronism with a falling edge of a warning generation period signal 111a are shown. Where the warning generation period signal 111a continues for a comparatively short period of time such as a period within which the pedals are rotated once, if it is intended to light the indicator 42 in synchronism with a falling edge of the warning generation period signal 111a. The indication manner will then be such that, after the driver feels a variation of the assisting force and confirms the indicator 42, the indicator 42 is extinguished after it is lit. Since the indication condition varies, it is easier to visually discern it from when the indicator 42 is lit continuously. It is to be noted that the lighting timing of the indicator 42 may be synchronized with a rising edge of the warning generation period signal 111a or the indicator 42 may be lit after a predetermined time lapse after a rising edge.

The indicator 42 may. be lit for a short time t1 (for example, 0.5 seconds) when the voltage of the battery power source is lower than the first reference value. However, when the voltage of the battery power source is further lower than the second reference value, the indicator 42 is lit for a longer time t2 (for example, about 1 second). Therefore, the remaining capacity of the battery can be visually discerned from the length of the lit time. Alternatively, where an indication element such as a lamp or a light emitting diode is dynamically lit, the duration ratio may be varied to vary the brightness of the indication so that the remaining capacity of the battery may be discerned.

Where a warning generation period signal of a long period of several seconds to approximately 10 seconds is outputted as seen from (e) of FIG. 8, lighting/extinguishing may be repeated as seen from (f) and (g) of FIG. 8. Otherwise, the lighting interval may be varied in response to the voltage of the battery power source, or even if the lighting interval is equal, the rate between the lighting time and the extinguished time may be varied so that the degree of the remaining capacity may be discerned.

While FIG. 5 shows the construction wherein, when the battery power source voltage exhibits a drop after the assisting force A is calculated, the calculated assisting force is varied to vary the assisting force, the assisting force may be varied by changing the pedaling force T to be supplied to the assisting force calculation means 103. Alternatively, where the assisting force calculation means 103 includes an assisting force retrieval table for a case wherein the power source voltage is normal and assisting force retrieval tables for another case wherein the power source voltage is lower than the first reference voltage and a further case wherein the power source voltage is lower than the second reference voltage, the assisting force may be varied by changing over a table to be used in response to the voltage supervision output of the power source voltage supervision means 114. Further, upon production of a PWM signal, the assisting force may be varied as a construction for varying the duty of a PWM signal in response to the voltage supervision output.

Alternatively, by detecting the degree of the drop of the battery power source voltage among a plurality of three or more divisional stages, the assisting force may be varied or the indication manner may be varied in response to each degree of the drop.

Figure 9:
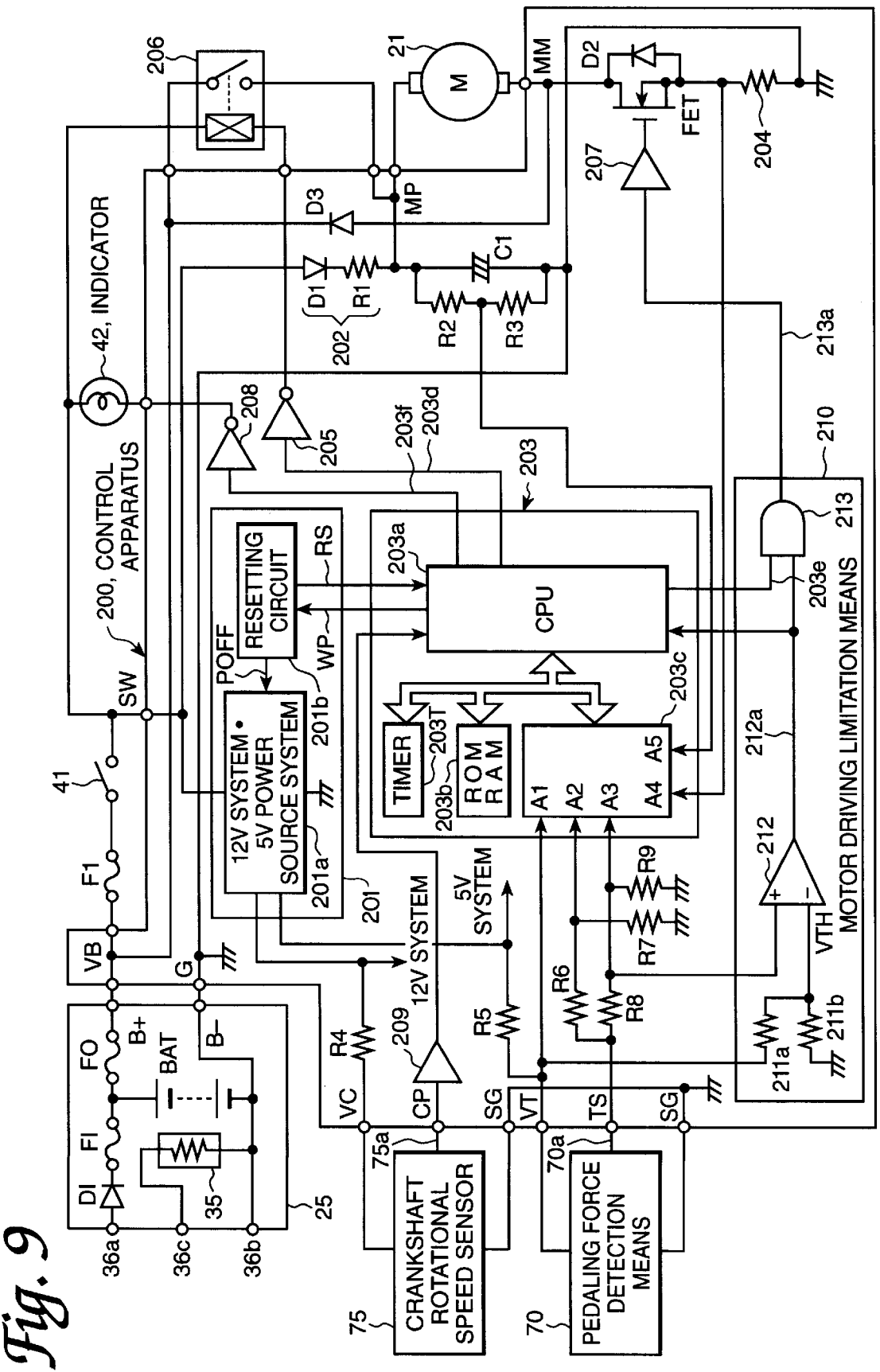
FIG. 9 shows a circuit construction view showing a detailed example of the control apparatus.

FIG. 9 is a circuit construction view showing a detailed example of the control apparatus. A battery power source BAT in the battery case assembly 25 is applied by way of a feeding side fuse FO from terminals B+ and B− of the feeding connector 38 to power source terminals B+ and B− of a control apparatus 200. It is to be noted that charging is performed from a positive pole side terminal 36a of the charging connector 36 by way of a diode DI and a charging side fuse FI. The heat sensitive resistance element 35 for detecting the battery temperature upon charging is connected at a terminal thereof to a negative pole side terminal 36b and at the other terminal to a signal terminal 36c.

If the main switch (key switch) 41 is turned on, the battery power source BAT is supplied from a positive pole side power source terminal VB of the control apparatus 200 to a power source/resetting circuit section 201 by way of the feeding side fuse FO, the main switch 41 and a terminal SW. Charging of a capacitor C1 for stabilizing the motor power source is performed by way of a pre-charging circuit 202 constituted from a diode D1 and a charge current limiting resistor R1.

The power source/resetting circuit section 201 includes a 12 V system and 5 V system power source 201a for stepping down the battery power source of, for example, a 24 V system and outputting stabilized power sources of a 12 V system and a 5 V system. Section 201 also includes a resetting circuit 201b which operates with the 5 V system power source. The 12 V system power source is used for the crankshaft rotational speed sensor 75 and as a gate controlling voltage for the field effect transistor FET for power for controlling energization of the motor 21. The 5 V system power source is used by a one-chip microcomputer 203, motor driving limitation means 210, a motor current detection circuit 204 and so forth.

The resetting circuit 201b supplies a reset pulse RS to a CPU upon first transition of the 5 V system power source and supervises a watchdog pulse WP outputted in a predetermined cycle from the CPU 203a. When a watchdog pulse WP is not supplied for more than a predetermined time, the resetting circuit 201b outputs a reset pulse RS to reset (initialize) the CPU. Further, if supply of a watchdog pulse WP is not resumed after a reset pulse RS is outputted, the resetting circuit 201b supplies a cutoff instruction POFF to the 12 V system and 5 V system power source 201a to stop supply of the 12 V and 5 V power sources.

The motor operation control means 100, the assisting force variation type warning means 110, the indicator control means 120 and so forth shown in FIG. 5 are constituted using the one-chip microcomputer 203 in which the CPU 203a, a ROM/RAM 203b, an A/D converter 203c, a timer 203T of a plurality of systems and so forth are built.

A voltage across the capacitor C1 for stabilizing the motor power source is divided by a resistor R2 and another resistor R3 so that it may fall within an allowable input voltage range of the A/D converter 203c. The divided voltage is supplied to an input terminal A5 of the A/D converter 203c. The CPU 203a outputs, after initialization processing performed in response to a reset pulse RS, a relay driving instruction 203d at a point of time when the divided voltage value after A/D conversion exceeds a preset voltage. Consequently, an exciting winding of a relay 206 is energized by way of a relay driving circuit 205 to put the contacts of the relay 206 into a closed condition so that the battery power source BAT is applied to the motor 21.

Since the voltage across the capacitor C1 for stabilizing the motor power source is supervised and the contacts of the relay 206 are closed after the capacitor C1 is charged up, an excessive charging current will not flow by way of the contacts of the relay 206, and the contacts will not be damaged. It is to be noted that, at a point of time when the rising rate per time of the voltage across the capacitor C1 becomes lower than a predetermined value, it may be determined that precharging of the capacitor C1 has been completed to render the relay 206 operative. According to the determination based on the variation of the voltage, completion of pre-charging can be detected irrespective of the voltage value of the battery power source BAT.

If the field effect transistor FET for controlling the energization of the motor 21 fails by short-circuiting between the drain and the source or if a diode D2 connected in parallel between the source and the source for absorbing a surge voltage in the reverse direction fails by short-circuiting or the like, the voltage across the capacitor C1 is a voltage equal to the battery voltage divided by the charge current limiting resistor R1 and the resistance of the winding of the motor 21. The resistance value of the charge current limiting resistor R1 is set sufficiently higher than the resistance value of the winding of the motor 21. Accordingly, if such short-circuiting failure as described above occurs, since the voltage across the capacitor C1 does not rise by precharging, driving of the relay 206 is inhibited. Supply of excessive current as a result of the short-circuiting failure can be prevented.

Further, the CPU 203a supervises the voltage across the capacitor C1 even when the motor 21 is in an operating condition. The CPU 203a performs correction of the energization ratio of a PWM signal 203e so that a desired assisting torque may be obtained in response to an actual voltage value applied to the motor 21. Consequently, even when the battery power source voltage drops or the like, a desired assisting torque can be generated.

A surge voltage of the reverse polarity which is produced when energization of the motor 21 is stopped is absorbed by the battery power source BAT by way of a diode D3. For the feeding side fuse FO, a fuse for a high current (several ten amperes) is used. Since feeding to the motor 21 is performed by way of the contacts of the relay 206, the current resisting amount of the main switch 41 may be small and a fuse F1 connected in series to the main switch 41 may be constructed for a small capacity (several amperes).

The 12 V system power source is supplied to the crankshaft rotational speed sensor 75 by way of a bleed resistor R4. Even if a short-circuiting failure or the like occurs on the crankshaft rotational speed sensor 75 side with respect to a terminal VC, since the short-circuit current is limited by the bleed resistor R4, the power source circuit is protected. A crank rotational speed detection signal 75a supplied to a terminal CP is waveform shaped by a waveform shaping circuit 209 and converted into a signal of the logic amplitude of the 5 V system, which is supplied to the input terminal of the CPU 203a.

The 5 V system power source is supplied to the pedaling force detection means 70 by way of a bleed resistor R5. Even if a short-circuiting failure or the like occurs on the pedaling force detection means 70 side with respect to a terminal VT, since the short-circuit current is limited by the bleed resistor R5, the power source circuit is protected. A pedaling force detection output (voltage signal) 70a supplied to a terminal TS is divided by a pair of sets of voltage dividing circuits having different voltage dividing ratios. The thus divided voltages are supplied the A/D converter 203c. The voltage dividing ratio of one of the voltage dividing circuits which is constructed from a resistor R6 and another resistor R7 is set, for example, to 1/2, and the voltage dividing ratio of the other voltage dividing circuit which is constructed from a resistor R8 and another resistor R9, is set, for example, to 1/4.

A pair of systems for detection of voltages having different voltage dividing ratios are prepared, and the CPU 203a detects the magnitude of a detection torque based on A/D conversion data of the two systems. When the detection torque is low, the CPU 203a selects the D/A conversion data of the voltage (voltage dividing ratio 1/2) supplied to an A/D input terminal A2. However, when the torque is high, the CPU 203a selects the D/A conversion data of the voltage (voltage dividing ratio 1/4) supplied to another A/D input terminal A3. A torque is thereby converted taking the voltage dividing ratio into consideration. Due to such construction and processing, even if the resolution of the A/D converter 203c is equal, a torque value with a high degree of accuracy can be detected over a wide range from a low torque to a high torque.

Since the detection output of the pedaling force detection means 70 is influenced by the power source voltage supplied thereto, the voltage actually being supplied to the pedaling force detection means 70 is supplied to the A/D input terminal A1, and the detection voltage is corrected based on D/A conversion data of the voltage in order to detect a pedaling force with a high degree of accuracy.

A voltage comparator 212 in the motor driving limitation means 210 is constructed so as to compare a threshold value voltage VTH obtained by dividing the voltage being supplied to the pedaling force detection means 70 by means of a resistor 211a and another resistor 211b with the voltage obtained by dividing the pedaling force detection output 70a by means of the resistor R8 and the resistor R9. Since the voltage being supplied to the pedaling force detection means 70 is divided to obtain the threshold value voltage VTH, it can be determined with a higher degree of accuracy whether or not the pedaling force exceeds a predetermined value.

An output 212a of the voltage comparator 212 is supplied to an input terminal of the CPU 203a. The CPU 203a supervises the condition wherein the output 212a of the voltage comparator 212 is at an L level occurs cyclically. At this level, the pedaling force is zero. If the condition wherein the pedaling force is zero is not detected cyclically in a condition wherein the motor 21 is operating based on detection of a pedaling force based on A/D conversion data, output of the PWM signal 203e is stopped to stop operation of the motor 21. By this, it is prevented that operation of the pedaling force detection system such as the pedaling force detection means 70 and the A/D converter 203c is not normal and an unnecessary assisting torque is generated.

The CPU 203a retrieves a PWM duty map based on a pedaling force detected by way of the A/D converter 203c and a pulse signal 75a corresponding to the crank rotary shaft rotational speed and produces and outputs a PWM signal 203e corresponding to the thus found duty map.

The PWM signal 203e is supplied by way of a logical AND circuit 213 to a FET driving circuit 207 while the output 212a of the voltage comparator 212 remains at an H level. In other words, while a pedaling force higher than a predetermined value is being detected. The FET driving circuit 207 supplies electric power to the field effect transistor FET in response to a logical AND output signal 213a to drive the field effect transistor FET to perform a switching operation. Consequently, the motor 21 is driven under PWM control.

The CPU 203a supervises the motor current to check whether or not the driving operation of the motor 21 is proceeding normally, and limits operation of the motor 21 when it detects an abnormal current value.

Detection of the motor current is based on data obtained by A/D conversion of a voltage, which corresponds to a motor current and is produced between the opposite ends of the current detection resistor 204 interposed between the source of the field effect transistor FET and the negative pole of the battery power source BAT. The voltage is supplied to an A/D conversion input terminal A5 of the A/D converter 203c. The CPU 203a is constructed so as to suppress the energization duty low or stop operation of the motor 21 when the motor current value is excessively high based on voltage data according to the motor current value after A/D conversion.

Further, the A/D converter 203c starts counting of the timer 203T at a point of time when the voltage data according to the motor current value after A/D conversion exceeds a preset value at which the motor current substantially corresponds to zero or is near to zero. When the motor current does not become lower than the value substantially corresponding to zero within an allowable time set in advance, the one-chip microcomputer 203 stops outputting the relay driving instruction 203d to stop feeding to the motor 21. Accordingly, even if the operation of the pedaling force detection system is not normal and the pedaling force does not return to zero, an unnecessary assisting force will not continue to be supplied.

The CPU 203a compares the data regarding the battery power source voltage fetched thereto by way of the A/D converter 203c with the first and second reference voltages VTH1 and VTH2 set in advance. When the battery power source voltage is lower than the first reference voltage VTH1, the CPU 203a first decreases the assisting force moderately and then restores the assisting force moderately, for example, as seen from (k) of FIG. 7. This will appeal to the physical feeling of the driver and notify the driver that the battery power source voltage is in a dropped condition. Further, the CPU 203*a* causes the indicator 42 to be lit for a predetermined short period of time by way of the lamp driving circuit 208 to indicate that the remaining capacity of the battery is small and a charging time has come. Further, when the battery power source voltage has dropped lower than the second reference voltage VTH2, supplying of the assisting force is stopped, for example, for 10 seconds, and then assisting is performed again. While assisting is held stopped in this manner, blinking indication wherein the indicator 42 is, for example, lit for 0.5 seconds and extinguished for 0.5 seconds is repeated. When the driver continues driving without switching the main switch 41 off, stopping of assisting for 10 seconds and re-starting of assisting are repeated. Accordingly, the number of such repetitions is counted, and for example, if the number of repetitions exceeds four times, the relay 206 is controlled into an off-state to completely stop energization of the motor 21 while output of the indicator driving signal 121*a* continues to continuously light the indicator 42.

Figure 10:
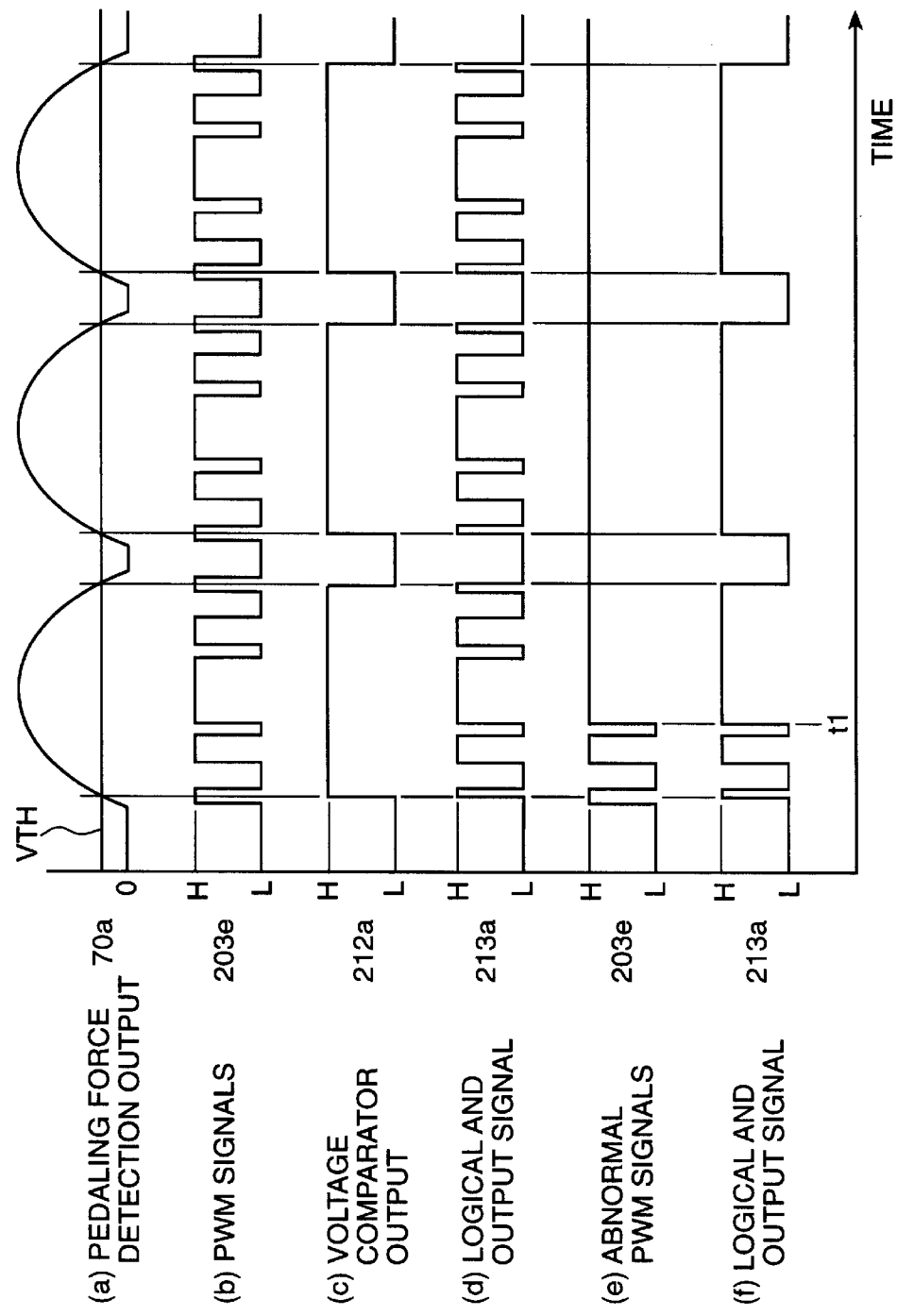
FIG. 10 shows a time chart illustrating operation of motor driving limiting means.

FIG. 10 is a time chart illustrating operation of the motor driving limiting means.

When the pedals of the bicycle are pedaled, since no pedaling force is applied at the top dead center and the bottom dead center, the pedaling force detection output 70*a* exhibits a voltage waveform which repeats a cyclic increase and decrease as shown in (a) of FIG. 10. The voltage comparator 212 outputs a signal 212*a* of an H level as seen from (c) of FIG. 10 while the voltage of the pedaling force detection output 70*a* exceeds the threshold value voltage VTH. Accordingly, when the PWM signal 203*e* shown in (b) of FIG. 10 is produced and outputted from the CPU 203*a* in response to the voltage signal 70*a*, a logical AND output signal 213*a* shown in (d) of FIG. 10 is outputted by way of the logical AND circuit (AND gate) 213. Operation of the motor 21 is controlled in response to the logical AND output signal 213*a*. In particular, only while the pedaling force exceeds the threshold value, operation of the motor 21 is allowed and an assisting force is supplied thereto.

Even if some cause prevents the one-chip microcomputer 203 and so forth from operating regularly for example, the output of an H level is maintained after a time t1 as seen from (e) of FIG. 10, operation of the motor 21 is permitted only while the pedaling force exceeds the threshold value as seen from (f) of FIG. 10. Accordingly, even if operation of the one-chip microcomputer 203 and so forth is no longer normal, an assisting power will not be supplied from the motor 21 while the pedals are not pedaled.

Figure 11:
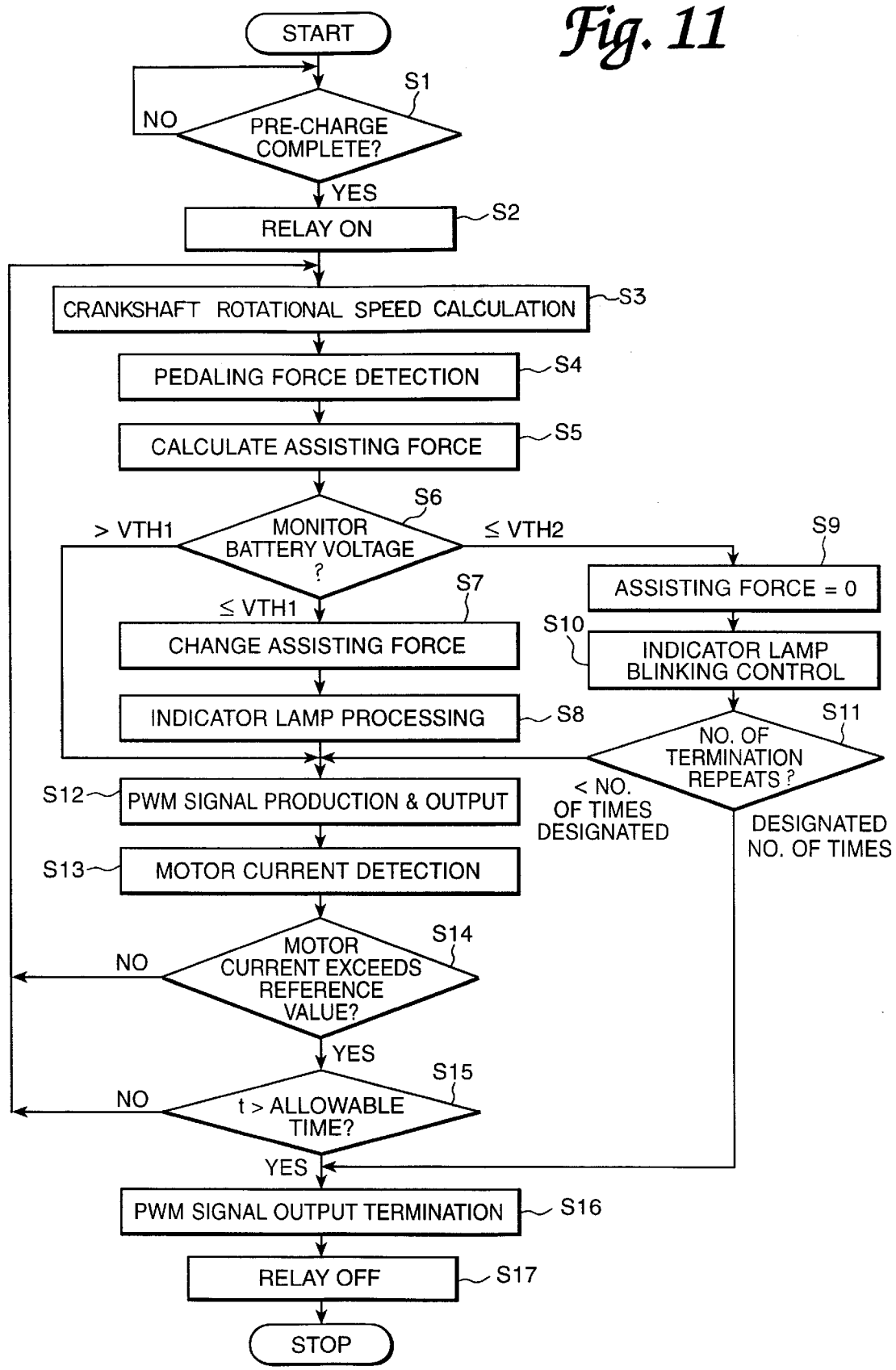
FIG. 11 shows a flow chart illustrating general operation of the control apparatus.

FIG. 11 is a flow chart illustrating general operation of the control apparatus.

The CPU 203*a* determines at step (S1) whether or not pre-charging of the capacitor C1 for stabilizing the motor power source has been completed. After completion of pre-charging, the CPU 203*a* outputs a relay driving instruction 203*d* (S2). Then, calculation of the crankshaft rotational speed (S3) and detection of the pedaling force (S4) are performed, and the assisting force A is calculated (S5).

Then, the CPU 203*a* supervises the battery voltage (S6), and when the battery voltage exceeds the first reference voltage VTHI, the CPU 203*a* produces and outputs, at step (S12), a PWM signal necessary to supply the assisting force A to perform PWM operation of the motor 21. When the voltage of the battery power source is lower then the first threshold value VTH1 but exceeds the second threshold value VTH2, the CPU 203*a* varies the assisting force A at step (S7) and causes the indicator 42 to be lit for a predetermined time at step (S8). When the voltage of the battery power source is lower than the second threshold value VTH2, the CPU 203*a* varies the assisting force to zero or a low value at step (S9) and performs blinking control of the indicator 42 at step (S10). At step (S11), the CPU 203*a* counts the number of times by which the assisting force has been varied to zero or the low value. If the number of repetitions reaches, for example, five times, the CPU 203*a* performs assisting complete stopping processing at the following steps beginning with step (S16).

At step (S12), a PWM signal is produced and outputted in accordance with the assisting force or the varied assisting force. Then, at step (S13), a current actually flowing through the motor is detected. At step (S14), it is checked whether or not the motor current exceeds a reference value. If the time within which the motor current exceeds the reference value is supervised and reaches an allowable time at step (S15), the CPU 203*a* stops outputting of the PWM signal (S16) and stops outputting of the relay driving instruction 203*d* to stop feeding to the motor 21 (S17).

It is to be noted that, in the detailed example described above, the assisting force variation type warning means 110 and the indicator control means 120 shown in FIG. 5 are realized with steps S6 to S11.

As described above, with an electric power assisted bicycle, if the assisting force variation type warning means detects a drop of the voltage of the battery power source, then it intentionally varies the driving condition of the motor to vary the assisting force, the assisting force to be supplied from the motor is varied. Because the feeling in pedaling the pedals varies, the driver can physically feel that the capacity of the battery power source has been reduced. Consequently, even if no attention is paid to an indication of an indicator or the like, the driver rapidly becomes aware at a point in time when the voltage drops that the remaining capacity of the battery has become small.

It is to be noted that, by varying the degree of variation of the assisting force in response to the degree of the drop of the voltage of the battery power source, the driver can perceive the remaining capacity of the battery. For example, since the feeling in pedaling the pedals has become a little heavy, charging is required early or since the feeling in pedaling the pedals is considerably heavy, the battery may be soon exhausted.

With the electric power assisted bicycle the indicator is caused to blink in association with the variation of the assisting force. It can therefore be confirmed from the blinking of the indication that the variation in driving feeling originates from a reduction of the remaining capacity of the battery power source. If the driver physically feels the variation in assisting force and carefully observes the indication section or the like, then since the indicator of a battery remaining capacity warning lamp or a warning lamp which indicates that charging is required is blinking, it can be readily recognized that the variation of the assisting force is originated from the reduction of the battery capacity.

Further, since the blinking manner of the indicator is varied in response to the degree of the drop of the voltage of the battery power source, such remaining capacity of the battery that the battery may be soon exhausted can be visibly indicated. For example, the blinking interval of the indicator can be reduced or the rate of the time within which the indicator is lit can become higher than the rate of the time within which the indicator is extinguished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric power assisted bicycle comprising:
pedals for driving the bicycle by a pedaling force;
a motor for assisting the pedals in driving the bicycle by supplying an assisting force in addition to the pedaling force;
a battery for supplying power to drive the motor; and
assisting force variation warning means for varying the assisting force when voltage of the battery drops and after the assisting force is zero whereby a warning of a drop in battery voltage is supplied to a driver of the bicycle.

2. The electric power assisted bicycle according to claim 1, wherein the assisting force variation warning means varies the assisting force by different amounts dependent upon an amount of drop in voltage of the battery.

3. The electric power assisted bicycle according to claim 1, further comprising:
an indicator for indicating at least one of a drop in voltage of the battery and a need to charge the battery; and
indicator control means for activating the indicator when the assisting force variation warning means varies the assisting force.

4. The electric power assisted bicycle according to claim 3, wherein the indicator issues a visible signal and wherein the indicator control means blinks the indicator when the assisting force variation warning means varies the assisting force.

5. The electric power assisted bicycle according to claim 4, wherein the indicator control means varies blinking of the indicator in response to an amount of drop of voltage of the battery.

6. The electric power assisted bicycle according to claim 1, wherein the assisting force variation warning means reduces assisting force by a first amount when battery voltage drops to a first predetermined level and wherein the assisting force variation warning means reduces assisting force by a second amount when battery voltage drops to a second predetermined level, the voltage of the second predetermined level being less than the voltage of the first predetermined level and the second amount of reduction in assisting force being greater than the first amount of reduction such that a first increase in pedaling force is required to drive the bicycle when the voltage drops to the first predetermined level and a second increase in pedaling force is required when the voltage drops to the second predetermined level, the increase in pedaling force required therefore increasing as the voltage of the battery drops.

7. The electric power assisted bicycle according to claim 1, further comprising:
a crankshaft extending between the pedals;
a crankshaft rotational speed sensor adjacent the crankshaft for determining the speed of the crankshaft and outputting a crankshaft rotational speed signal;
pedaling force detection means for outputting a pedaling force signal;
control means for controlling the motor, the control means including the assisting force variation warning means, the control means being operatively connected to the motor and to the crankshaft rotational speed sensor and to the pedaling force detection means.

8. The electric power assisted bicycle according to claim 7, wherein the control means further includes motor drive control means and the assisting force variation warning means, and wherein;
the crankshaft rotational speed sensor outputs the crankshaft rotational speed signal to the motor drive control means and the pedaling force detection means outputs the pedaling force signal to the motor drive control means,
whereafter the motor drive control means outputs an assisting force signal to the assisting force variation warning means,
the assisting force variation warning means then outputting one of the assisting force signal and a changed variation assisting force signal back to the motor drive control means dependent upon voltage of the battery, if voltage of the battery remains above a predetermined level for a predetermined period of time, the assisting force variation warning means outputs the assisting force signal back to the motor drive control means and if voltage of the battery drops below a predetermined level for a predetermined period of time, the assisting force variation warning means outputs the changed variation assisting force signal back to the motor drive control means,
the motor drive control means thereafter outputting a PWM signal which is dependent on receipt of one of the assisting force signal and the changed variation assisting force signal from the motor drive control means, the PWM signal being output from the motor drive control means to the motor to control an amount of assisting force provided by the motor,
when the assisting force signal is received in the motor drive control means from the assisting force variation warning means, the PWM signal enabling the motor to output the assisting force, and
when the changed variation assisting force signal is received in the motor drive control means from the assisting force variation warning means, the PWM signal at least reducing the assisting force provided by the motor.

9. The electric power assisted bicycle according to claim 8, wherein the control means further comprises indicator control means and wherein the bicycle further comprises:
an indicator for indicating at least one of a drop in voltage of the battery and a need to charge the battery;
the indicator control means activating the indicator when the assisting force variation warning means outputs the changed variation assisting force signal.

10. The electric power assisted bicycle according to claim 9, wherein the indicator control means comprises indicator format control means and indicator format memory means, the indicator format memory means being operatively connected to the indicator format control means, the indicator format control means being operatively connected to the assisting force variation warning means and to the indicator, the indicator format control means outputting an indicator driving signal in response to the changed variation assisting force signal from the assisting force variation warning means, the indicator driving signal activating the indicator.

11. The electric power assisted bicycle according to claim 8, wherein the motor drive control means further comprises crank rotational speed calculation means, an A/D converter, assisting force calculation means and PWM signal production means, the crank rotational speed calculation means receiving the crankshaft rotational speed signal from the crankshaft rotational speed sensor and thereafter outputting rotational speed of the crankshaft to the assisting force calculation means, the A/D converter receiving the pedaling force signal from the pedaling force detection means and thereafter outputting a signal of the pedaling force to the assisting force calculation means, the assisting force calculation means using the rotational speed of the crankshaft and the pedaling force to output the assisting force signal to the assisting force variation warning means, the assisting force variation means thereafter outputting the one of the assisting force signal and the changed variation assisting force signal back to the PWM signal production means of the motor drive control means, the PWM signal production means thereafter outputting the PWM signal to the motor.

12. The electric power assisted bicycle according to claim 11, wherein the assisting force variation warning means further comprises assisting force variation control means and voltage drop detection means, and wherein;

the assisting force calculation means outputs the assisting force signal to the assisting force variation control means of the assisting force variation warning means, the assisting force variation control means being operatively connected to the voltage drop detection means, the voltage drop detection means being operatively connected to the battery, the voltage drop detection means outputting a voltage drop signal to at least the assisting force variation control means when voltage of the battery drops below the predetermined level for the predetermined period of time, the voltage drop detection means being operatively connected to the battery, the voltage drop detection means outputting a voltage drop signal to at least the assisting force variation control means when voltage of the battery drops below the predetermined level, and the assisting force variation control means outputting the assisting force signal to the PWM signal production means if the voltage drop detection means fails to output the voltage drop signal and the assisting force variation control means outputting the changed variation assisting force signal to the PWM signal production means if the voltage drop detection means outputs the voltage drop signal.

13. The electric power assisted bicycle according to claim 12, wherein the control means further comprises indicator control means and wherein the bicycle further comprises:

an indicator for indicating at least one of a drop in voltage of the battery and a need to charge the battery;

the indicator control means activating the indicator when the assisting force variation control means outputs the changed variation assisting force signal.

14. The electric power assisted bicycle according to claim 13, wherein the voltage drop detection means also outputs the voltage drop signal to the indicator control means, the indicator control means controlling the indicator in response to both the voltage drop signal from the voltage drop detection means and to the changed variation assisting force signal from the assisting force variation control means.

15. The electric power assisted bicycle according to claim 12, wherein the voltage drop detection means further comprises a second A/D converter, power source voltage supervision means and reference voltage setting means, wherein;

the second A/D converter being operatively connected to the battery, voltage being supplied from the battery to the second A/D converter, and the second A/D converter outputting a voltage signal to the power source voltage setting means, the reference voltage setting means being set to a first predetermined voltage at which an initial warning of a drop in battery capacity is to be generated and to a second predetermined voltage at which a second warning of a further drop in battery capacity is to be generated, the reference voltage setting means being operatively connected to the power source voltage supervision means, the power source voltage supervision means storing a predetermined number of voltage signals from the second A/D converter and thereafter calculating an average value for the voltage signals, the power source voltage supervision means then comparing the average value with the first predetermined voltage and the second predetermined voltage from the reference voltage setting means, the power source voltage supervision means outputting a first voltage drop detection signal when the average value is below the first predetermined voltage, the power source voltage supervision means outputting a second voltage drop detection signal when the average value is below the second predetermined voltage, the assisting force variation control means receiving the first and second voltage drop detection signals from the power source voltage supervision means, if the assisting force variation control means fails to receive one of the first and second voltage drop detection signals, then the assisting force variation control means outputs the assisting force signal to the PWM signal production means, if the assisting force variation control means receives one of the first and second voltage drop detection signals, then the assisting force variation control means outputs a changed variation assisting force signal to the PWM signal production means.

16. The electric power assisted bicycle according to claim 1, further comprising:

a battery case for receiving the battery, the battery comprises a plurality of individual batteries provided in two rows in the battery case, adjacent individual batteries in each row being electrically connected and an individual battery at one end of each row being electrically connected;

a gear box on which the pedals are mounted; and a down tube extending from the gear box, the battery case being mounted on the down tube of the bicycle and a portion of the battery case being a part of an outer surface of a body of the bicycle.

17. The electric power assisted bicycle according to claim 1, wherein the assisting force variation warning means varies the assisting force when the voltage of the battery drops below a first predetermined level and wherein the assisting force variation warning means terminates the assisting force when the voltage of the battery drops below a second predetermined level, the second predetermined level being lower than the first predetermined level.

18. The electric power assisted bicycle according to claim 1, wherein the assisting force variation warning means gradually decreases and then gradually increases the assisting force when voltage of the battery drops below a predetermined level.

19. The electric power assisted bicycle according to claim 1, wherein the pedals are rotatable for driving the bicycle and wherein the assisting force variation warning means varies the assisting force for several rotations of the pedals when the voltage of the battery drops.

20. The electric power assisted bicycle according to claim 19, wherein the motor initially supplies the assisting force at an initial level and wherein the assisting force variation warning means first decreases the assisting force and then returns the assisting force to the initial level after several rotations of the pedals.

* * * * *

UNITED STATES PATENT AND TRADEMARK OFFICE
CERTIFICATE OF CORRECTION

PATENT NO. : 5,806,621

DATED : 9/15/98

INVENTOR(S) : Soda et al.

Figure 5B:
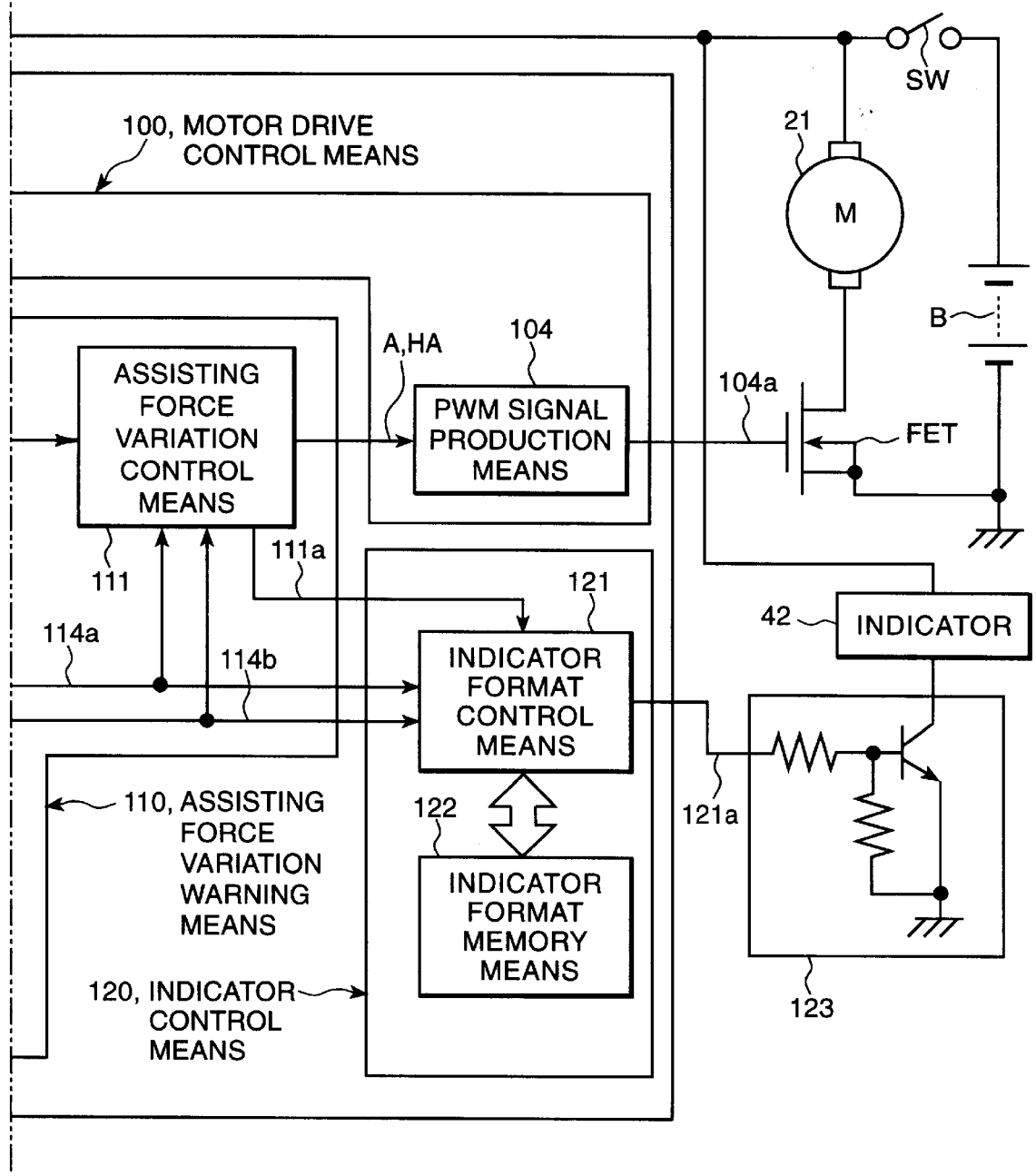
FIG. 5 shows a functional block diagram of a control apparatus of the electric power assisted bicycle according to the present invention.

It is certified that error appears in the above-identified patent and that said Letters Patent is hereby corrected as shown below:

Column 3, line 9, change "Figure 5 shows" to --Figures 5A and 5B show--.

Column 6, line 59, change "Figure 5 is" to --Figures 5A and 5B are--.

Signed and Sealed this

Twenty-third Day of February, 1999

Attest:

Q. TODD DICKINSON

*Attesting Officer*   *Acting Commissioner of Patents and Trademarks*